United States Patent
Paquette et al.

(10) Patent No.: US 8,432,396 B2
(45) Date of Patent: Apr. 30, 2013

(54) REFLECTIONS IN A MULTIDIMENSIONAL USER INTERFACE ENVIRONMENT

(75) Inventors: Michael James Paquette, Benicia, CA (US); Bas Ording, San Francisco, CA (US); John O. Louch, San Luis Obispo, CA (US); Imran A. Chaudhri, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1061 days.

(21) Appl. No.: 11/760,703

(22) Filed: Jun. 8, 2007

(65) Prior Publication Data
US 2008/0307366 A1    Dec. 11, 2008

(51) Int. Cl.
*G06T 15/10*   (2011.01)

(52) U.S. Cl.
USPC .......................................... 345/427; 345/581

(58) Field of Classification Search .................. 345/419, 345/426, 427, 581; 715/810, 835, 836
See application file for complete search history.

(56) References Cited

U.S. PATENT DOCUMENTS

| | | | |
|---|---|---|---|
| 5,452,414 A * | 9/1995 | Rosendahl et al. ........... | 715/836 |
| 5,461,710 A | 10/1995 | Bloomfield et al. | |
| 5,483,261 A | 1/1996 | Yasutake | |
| 5,488,204 A | 1/1996 | Mead et al. | |
| 5,565,657 A | 10/1996 | Merz | |
| 5,566,294 A * | 10/1996 | Kojima et al. ................. | 715/866 |
| 5,717,848 A * | 2/1998 | Watanabe et al. ............. | 345/474 |
| 5,745,109 A * | 4/1998 | Nakano et al. ................ | 715/838 |
| 5,757,371 A * | 5/1998 | Oran et al. ..................... | 715/779 |
| 5,825,352 A | 10/1998 | Bisset et al. | |
| 5,835,079 A | 11/1998 | Shieh | |
| 5,877,769 A * | 3/1999 | Shinohara ..................... | 345/419 |
| 5,880,411 A | 3/1999 | Gillespie et al. | |
| 5,920,316 A * | 7/1999 | Oran et al. ..................... | 715/779 |
| 5,966,134 A * | 10/1999 | Arias ............................. | 345/589 |
| 5,983,369 A * | 11/1999 | Bakoglu et al. ................ | 714/46 |
| 6,016,150 A * | 1/2000 | Lengyel et al. ................ | 345/426 |
| 6,188,391 B1 | 2/2001 | Seely et al. | |
| 6,236,398 B1 * | 5/2001 | Kojima et al. ................ | 345/419 |
| 6,310,610 B1 | 10/2001 | Beaton et al. | |
| 6,323,846 B1 | 11/2001 | Westerman et al. | |
| 6,452,593 B1 * | 9/2002 | Challener ..................... | 345/419 |
| 6,473,751 B1 * | 10/2002 | Nikolovska et al. .................. | 1/1 |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Kawahara, et al., "Project Looking Glass: A Comprehensive Overview of the Technology", Revision 0.2, Mar. 14, 2006, 11 pages: https://lg3d.dev.java.net/files/documents/1833/149353/LG3D-Overview.pdf.*

(Continued)

*Primary Examiner* — Maurice L McDowell, Jr.
(74) *Attorney, Agent, or Firm* — Morrison & Foerster LLP (57) ABSTRACT

A graphical user interface has a back surface disposed from a viewing surface to define a depth. A visualization object receptacle is disposed between the back surface and a viewing surface and contains a visualization object. A reflection surface is defined such that a reflection of the visualization object is displayed on the reflection surface.

25 Claims, 5 Drawing Sheets

U.S. PATENT DOCUMENTS

| | | | | |
|---|---|---|---|---|
| 6,522,347 | B1* | 2/2003 | Tsuji et al. | 715/848 |
| 6,690,387 | B2 | 2/2004 | Zimmerman et al. | |
| 6,765,567 | B1 | 7/2004 | Roberson et al. | |
| 6,931,610 | B1* | 8/2005 | Buch et al. | 716/113 |
| 7,015,894 | B2 | 3/2006 | Morohoshi | |
| 7,043,701 | B2 | 5/2006 | Gordon | |
| 7,107,549 | B2* | 9/2006 | Deaton et al. | 715/836 |
| 7,119,819 | B1 | 10/2006 | Robertson et al. | |
| 7,126,605 | B1* | 10/2006 | Munshi et al. | 345/428 |
| 7,184,064 | B2 | 2/2007 | Zimmerman et al. | |
| 7,212,206 | B2* | 5/2007 | Green | 345/426 |
| 7,548,238 | B2* | 6/2009 | Berteig et al. | 345/426 |
| 7,567,248 | B1* | 7/2009 | Mark et al. | 345/426 |
| 7,663,607 | B2 | 2/2010 | Hotelling et al. | |
| 7,665,033 | B2* | 2/2010 | Byrne et al. | 715/782 |
| 7,735,018 | B2* | 6/2010 | Bakhash | 715/782 |
| 2002/0122038 | A1* | 9/2002 | Cowperthwaite | 345/428 |
| 2002/0140746 | A1 | 10/2002 | Gargi | |
| 2002/0167546 | A1 | 11/2002 | Kimbell et al. | |
| 2003/0133589 | A1* | 7/2003 | Deguillaume et al. | 382/100 |
| 2003/0179234 | A1 | 9/2003 | Nelson et al. | |
| 2003/0179237 | A1 | 9/2003 | Nelson et al. | |
| 2004/0109031 | A1* | 6/2004 | Deaton et al. | 345/848 |
| 2004/0135820 | A1* | 7/2004 | Deaton et al. | 345/848 |
| 2005/0010876 | A1 | 1/2005 | Robertson et al. | |
| 2005/0066292 | A1 | 3/2005 | Harrington | |
| 2005/0240880 | A1 | 10/2005 | Banks et al. | |
| 2005/0283742 | A1 | 12/2005 | Gusmorino et al. | |
| 2006/0026521 | A1 | 2/2006 | Hotelling et al. | |
| 2006/0107229 | A1* | 5/2006 | Matthews et al. | 715/782 |
| 2006/0161861 | A1 | 7/2006 | Holecek et al. | |
| 2006/0197753 | A1 | 9/2006 | Hotelling | |
| 2007/0070066 | A1* | 3/2007 | Bakhash | 345/419 |
| 2007/0098290 | A1* | 5/2007 | Wells | 382/254 |
| 2008/0059893 | A1* | 3/2008 | Byrne et al. | 715/757 |

OTHER PUBLICATIONS

Ofek, E. and Rappoport, A., Jul. 1998, "Interactive reflections on curved objects", Proceedings of the 25th Annual Conference on Computer Graphics and interactive Techniques SIGGRAPH '98, ACM, New York, NY, pp. 333-342.*

Lengyel, J. and Snyder, J., Aug. 1997, "Rendering with coherent layers", Proceedings of the 24th Annual Conference on Computer Graphics and interactive Techniques, ACM Press/Addison-Wesley Publishing Co., New York, NY, pp. 233-242.*

Kawahara, et al., "Project Looking Glass: A Java™ Technology-Based 3D Desktop Exploration", Sun's 2004 Worldwide Java Developer Conference, 2004 JavaOne Conference, Session TS-1586, 2004, 24 pages.*

Kawahara, et al., "Project Looking Glass: 3D Desktop Exploration . . . ", X Developer's Conference, Apr. 29, 2004, 37 pages: http://web.archive.org/web/20040805023925/wwws.sun.com/software/looking_glass/docs/LG-Xdevconf.pdf.*

Maltby, J. R., "Using Perspective in 3D File Management: Rotating Windows and Billboarded Icons", Proceedings of the international Conference on Computer Graphics, Imaging and Visualisation, Jul. 26-28, 2006, CGIV. IEEE Computer Society, Washington, DC, 30-37.*

Mohageg, M., Myers, R., Marrin, C., Kent, J., Mott, D., and Isaacs, P., "A user interface for accessing 3D content on the World Wide Web", Proceedings of the SIGCHI Conference on Human Factors in Computing Systems: Common Ground, Vancouver, British Columbia, Canada, Apr. 13-18, 1996, M. J. Tauber, Ed., CHI '96, ACM, New York, NY, pp. 466-472.*

Darrin Murph, "Leopard dock resembles Sun's Project Looking Glass?", Article acquired from internet, posted Jun. 12, 2007, 5 pages: http://www.engadget.com/2007/06/12/leopard-dock-resembles-suns-project-looking-glass/.*

Nourie, Dana, "Project Looking Glass: Its Architecture and a Sneak Preview of the API", Nov. 2004, Article retrieved from: http://java.sun.com/developer/technicalArticles/javaopensource/plg.html.*

Wohl, Amy D., "Interface lift [user interface]", IEEE Spectrum, vol. 42, No. 11, pp. 32-37, Nov. 2005.*

Ang, Jason, "Offset Surface Light Fields", Master's Thesis, University of Waterloo, Ontario Canada, 2003, 122 pages.*

Hakura, Z. S., Snyder, J. M., and Lengyel, J. E., Mar. 2001, "Parameterized environment maps", Proceedings of the 2001 Symposium on interactive 3D Graphics I3D'01, ACM, New York, NY, pp. 203-208.*

"Introducing Maya 5 3D for Beginners", Author Dariush Derakhshani, publisher Sybex; Paperback/DVD edition, Oct. 7, 2003, Chapters 10-11, 53 pages.*

Rui Bastos , Kenneth Hoff , William Wynn , Anselmo Lastra, Increased photorealism for interactive architectural walkthroughs, Proceedings of the 1999 symposium on Interactive 3D graphics, p. 183-190, Apr. 26-29, 1999.*

Frank Dachille, IX and Arie Kaufman, 2000, "GI-cube: an architecture for volumetric global illumination and rendering", Proceedings of the ACM SIGGRAPH/EUROGRAPHICS workshop on Graphics hardware (HWWS '00), Stephen N. Spencer (Ed.). ACM, New York, NY, USA, 119-128.*

Joachim Diepstraten, "Interactive Visualization Methods for Mobile Device Applications", PhD thesis, University of Stuttgart, Germany, 2005.*

Paul S. Heckbert , Pat Hanrahan, Beam tracing polygonal objects, ACM SIGGRAPH Computer Graphics, v.18 n.3, p. 119-127, Jul. 1984.*

Mei C., Popescu V., Sacks E.: "A hybrid backwardforward method for interactive reflections", Proceedings of the Second International Conference on Computer Graphics Theory and Applications (Barcelona, Spain, 2007).*

Three-Dimensional Desktop—Google Search [on-line], [retrieved Nov. 9, 2006]. Retrieved from the Internet URL: http://www.google.com/search?sourceid=navclient&ie=U...LJ:2006-42,GGLJ:en&q=%22three+dimensional+desktop%22.

3DNA Desktop [online], [retrieved Nov. 9, 2006]. Retrieved from the Internet URL: http://www.3dna.net/products/desktop.htm.

Metisse—Screenshots [on-line], [retrieved Nov. 9, 2006]. Retrieved from the Internet URL: http://insitu.lri.fi/~chapuis/metisse/screenshots.

Spatial Research [on-line], [retrieved Nov. 9, 2006]. Retrieved from the Internet URL: http://www.spatialresearch.com/spaces.

The TaskGallery [on-line], [retrieved Nov. 9, 2006]. Retrieved from the Internet URL: http://research.microsoft.com/ui/TaskGaller.

Rotate Widow, Java Technology Powers Vodafone Mobile Games Worldwide. Copyright 1994-2006 Sun Microsystems, Inc. [on-line], [retrieved Nov. 9, 2006]. Retrieved from the Internet URL: http://www.sun.com/jsp_utils/ScreenShotPopup.jsp?title=R....ss/&im=md_1.jpg& alt=Generic%20Screen%20Shot%20Alt%20Text.

Switch Desktops, Copyright 1994-2006 Sun Microsystems, Inc. [on-line], [retrieved Nov. 9, 2006]. Retrieved from the internet URL: http://www.sun.com/jsp_utils/ScreenShotPopup.jsp?title=Sw.../&im=pan-r_3.jpg&alt-Generic%20Screen%20Shot%20Alt%20Text11/9/2006.

Stanford Panorama, Copyright 1994-2006 Sun Microsystems, Inc. [on-line], [retrieved Nov. 9, 2006]. Retrieved from the internet URL: http://www.sun.com/jsp_utils/ScreenShotPopup.jsp?title=St.../&im=pan_2.jpg&alt=Generic%20Screen%20Shot%20Alt%20Text11/9/2006.

Java Solaris Communities Partners My Sun Sun [on-line], [retrieved Nov. 9, 2006]. Retrieved from the internet URL: http://www.sun.com/software/looking_glass/details.xml.

3D Desktop Project by Sun MicroSystems: A Revolutionary Evolution of Today's Desktop [online]. [retrieved Nov. 9, 2006]. Retrieved from the internet URL: http://www.lg3d.dev.java.net.

Agarawala A. and Balakrishnan R. (2006). "Keepin' It Real: Pushing the Desktop Metaphor with Physics, Piles and the Pen". [on-line], [retrieved May 14, 2008]. Retrieved from the internet URL: http://bumptop.com/BumpTop. Montréal, Québec, Canada.

BumpTop 3D Desktop Prototype—www.bumptop.com. (2008). [online], [retrieved May 14, 2008]. Retrieved from the internet URL: http://www.youtube.com/watch?v=M0ODskdEPnQ.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," *CHI '92*, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

REFLECTIONS IN A MULTIDIMENSIONAL USER INTERFACE ENVIRONMENT

BACKGROUND

A graphical user interface allows a large number of graphical objects or items to be displayed on a display screen at the same time. Leading personal computer operating systems, such as the Apple Mac OS®, provide user interfaces in which a number of visualizations of system objects can be displayed according to the needs of the user. Example system objects include system functions, alerts, windows, peripherals, files, and applications. Taskbars, menus, virtual buttons, a mouse, a keyboard, and other user interface elements provide mechanisms for accessing and/or activating the system objects corresponding to the displayed representations.

The graphical objects and access to the corresponding system objects and related functions, however, should be presented in a manner that facilitates an intuitive user experience. The use of metaphors that represent concrete, familiar ideas can facilitate such an intuitive user experience. For example, the metaphor of file folders can be used for storing documents; the metaphor of a file cabinet can be used for storing information on a hard disk; and the metaphor of the desktop can be used for an operating system interface.

As the capabilities of processing devices progress, however, so do the demands on the graphical user interface to convey information to the users in an intuitive manner.

SUMMARY

Disclosed herein is a multidimensional desktop graphical user interface. In one implementation, a method includes axially disposing a back surface from a viewing surface in a user interface. A reflection surface can be defined between the viewing surface and the back surface. A visualization receptacle containing a visualization object can be disposed between the reflection surface and the viewing surface. Visualization data associated with the visualization object can be transformed to produce a reflection of the visualization object on the reflection surface, which can be displayed on the viewing surface as emanating from the reflection surface.

In another implementation, a graphical user interface includes a viewing surface and a back surface axially disposed from the viewing surface. A reflection surface is disposed between the viewing surface and the back surface, and a visualization receptacle is disposed between the reflection surface and the viewing surface. The visualization receptacle contains a visualization object and a reflection of the visualization object can be displayed on the reflection surface.

In another implementation, a computer readable medium stores instructions that can be executable by a processing device. Upon such execution, the instructions can cause the processing device to display a back surface axially disposed from the viewing surface, define a reflection surface disposed between the viewing surface and the back surface, display a visualization receptacle having visualization object, and display a reflection of the visualization object on the reflection surface.

DETAILED DESCRIPTION

Figure 1:
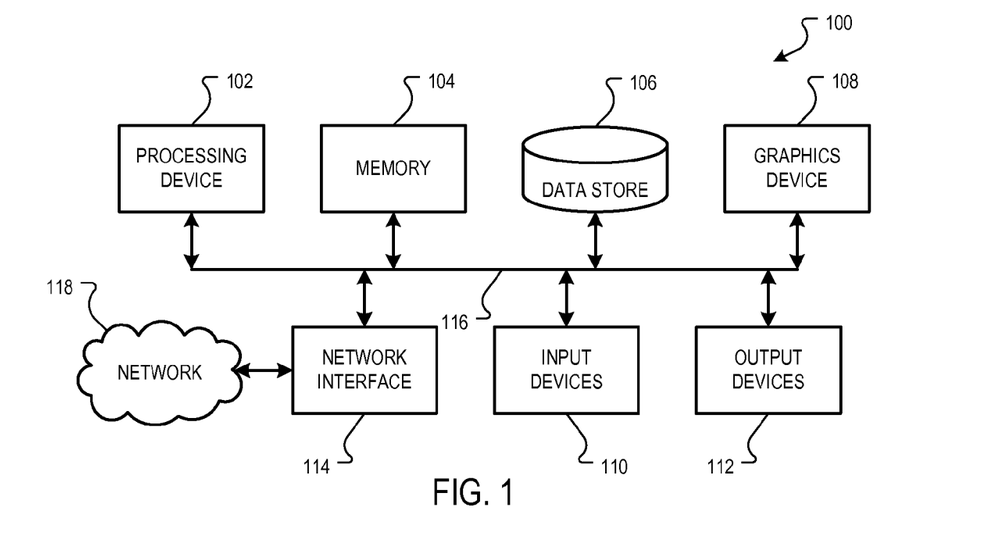
FIG. 1 is a block diagram of an example system that can be utilized to implement the systems and methods described herein.

FIG. 1 is a block diagram of an example system 100 that can be utilized to implement the systems and methods described herein. The system 100 can, for example, be implemented in a computer device, such as any one of the personal computer devices available from Apple Inc., or other electronic devices. Other example implementations can also include video processing devices, multimedia processing devices, portable computing devices, portable communication devices, etc.

The example system 100 includes a processing device 102, a memory 104, a data store 106, a graphics device 108, input devices 110, output devices 112, and a network interface 114. A bus system 116, such as a data bus and a motherboard, can be used to establish and control data communication between the components 102, 104, 106, 108, 110, 112 and 114. Other example system architectures, however, can also be used.

The processing device 102 can, for example, include one or more microprocessors. The memory 104 can, for example, include a random access memory storage device, such as a dynamic random access memory, or other types of computer-readable medium memory devices. The data store 106 can, for example, include one or more hard drives, a flash memory, and/or a read only memory, or other types of computer-readable medium memory devices.

The graphics device 108 can, for example, include a video card, a graphics accelerator card, or a display adapter, and is configured to generate and output images to a display device. In one implementation, the graphics device 108 can be realized in a dedicated hardware card connected to the bus system 116. In another implementation, the graphics device 108 can be realized in a graphics controller integrated into a chipset of the bus system 116. Other implementations can also be used.

Example input devices 110 can include a keyboard, a mouse, a stylus, a video camera, a multi-touch surface, etc., and example output devices 112 can include a display device, an audio device, etc.

The network interface 114 can, for example, include a wired or wireless network device operable to communicate data to and from a network 118. The network 118 can include one or more local area networks (LANs) or a wide area network (WAN), such as the Internet.

In an implementation, the system 100 includes instructions defining an operating system stored in the memory 104 and/or the data store 106. Example operating systems can include the MAC OS® X series operating system, the WINDOWS® based operating system, or other operating systems. Upon execution of the operating system instructions, access to various system objects is enabled. Example system objects include data files, applications, functions, windows, etc. To facilitate an intuitive user experience, the system 100 includes a graphical user interface that provides the user access to the various system objects and conveys information about the system 100 to the user in an intuitive manner.

Figure 2:
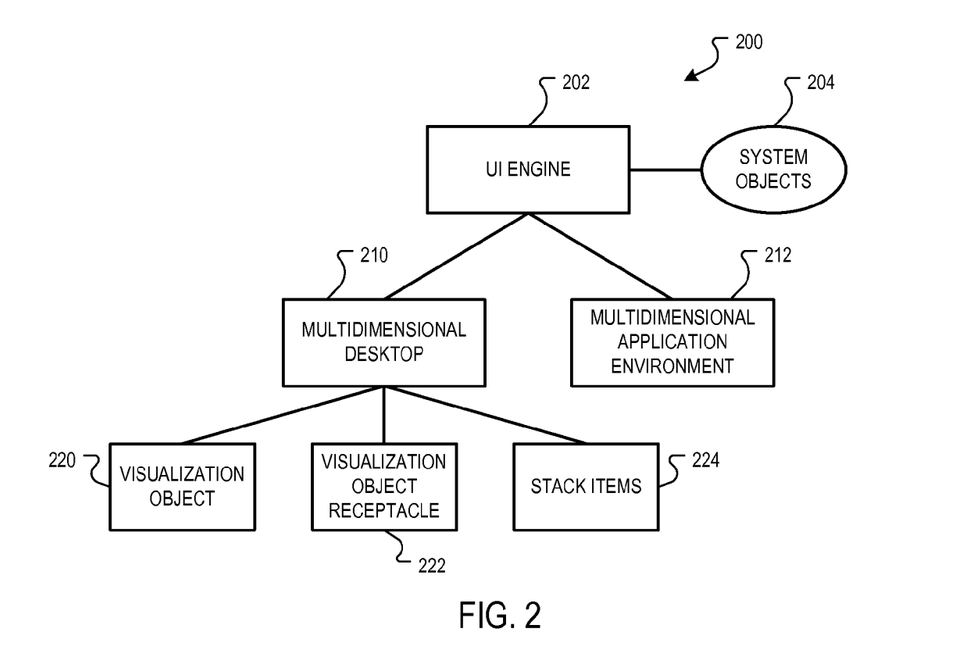
FIG. 2 is a block diagram of an example user interface architecture.

FIG. 2 is a block diagram of an example user interface architecture 200. The user interface architecture 200 includes a user interface (UT) engine 202 that provides the user access to the various system objects 204 and conveys information about the system 100 to the user.

Upon execution, the UI engine 202 can cause the graphics device 108 to generate a graphical user interface on an output device 112, such as a display device. In one implementation, the graphical user interface can include a multidimensional desktop 210 and a multidimensional application environment 212. In an implementation, the multidimensional desktop 210 and the multidimensional application environment 212 include x-, y- and z-axis aspects, e.g., a height, width and depth aspect. The x-, y- and z-axis aspects may define a three-dimensional environment, e.g., a "3D" or "2.5D" environment that includes a z-axis, e.g., depth, aspect.

In an implementation, the multidimensional desktop 210 can include visualization objects 220, a visualization object receptacle 222, and stack items 224. In some implementations, the visualization objects 220, the visualization object receptacle 222 and the stack items 224 can be presented in a pseudo-three dimensional (i.e., "2.5D") or a three-dimensional environment as graphical objects having a depth aspect.

A visualization object 220 can, for example, be a visual representation of a system object. In some implementations, the visualization objects 220 are icons. Other visualization objects can also be used, e.g., alter notification windows, menu command bars, windows, or other visual representations of system objects.

In an implementation, the multidimensional application environment 212 can include an application environment distributed along a depth aspect. For example, a content frame, e.g., an application interface, can be presented on a first surface, and control elements, e.g., toolbar commands, can be presented on a second surface.

In an implementation, the UI engine 202 generates the visualization of the multidimensional desktop 210 and multidimensional application environment 212 by compositing a plurality of layers (e.g., the first surface and the second surface) into a composite layer. The UI engine 202 can include utilize the memory 104 to store the composite layer. A graphical pipeline can be coupled to the UI engine 202 and may be adapted to transport the composite graphical layer to an output to a display device.

Figure 3:
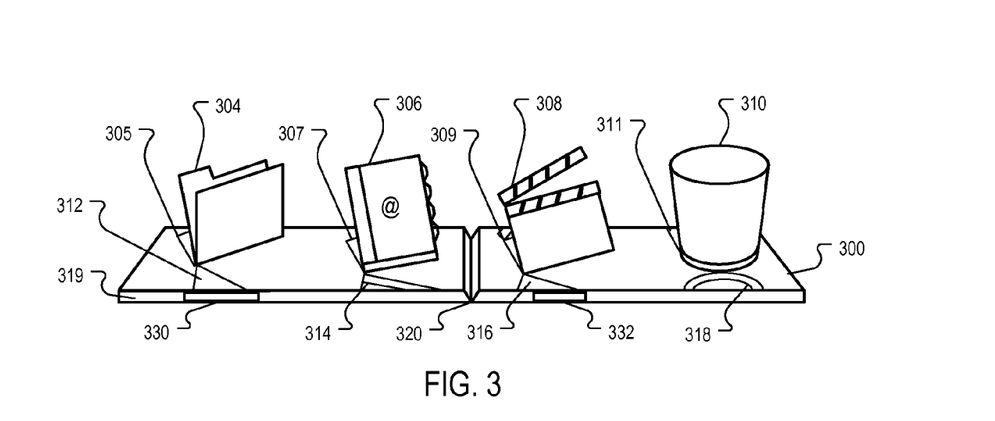
FIG. 3 is an image of an example visualization receptacle.

FIG. 3 is an image of an example visualization object receptacle 300. In one implementation, the visualization object receptacle 300 can include x-, y- and z-axis aspects, e.g., a height, width and depth. In another implementation, the visualization object receptacle 300 can have only a y- and z-axis aspect, e.g., a width and depth. An example implementation of a visualization object receptacle 300 is the "Dock" user interface in the MAC OS® X Leopard operating system. Other implementations can also be used.

In some implementations, or more visualization objects, e.g., icons 304, 306, 308 and 310 can be disposed within the visualization object receptacle 300, e.g., a visualization receptacle 300. In one implementation, a lighting and shading effect is applied to emphasize the depth aspect of the visualization receptacle 300, as illustrated by the corresponding shadows 305, 307, 309 and 311 and reflections 312, 314, 316 and 318 beneath each of the icons 304, 306, 308 and 310.

In some implementations, the visualization receptacle 300 can include front surface 319 to generate a height aspect. In some implementations, a notch 320 can be included in the visualization receptacle. The notch 320 can, for example, be utilized to arrange icons related to particular programs or functions, e.g., files and folders can be dispose on a first side of the notch 320 and applications can be disposed on a second side of the notch 320; or a user may define arrangements according to the notch 320, etc.

In some implementations, the visualization receptacle 300 can include status indicators, e.g., 330 and 332, disposed on the front surface 319. The status indicators 330 and 332 can, for example, appear as illuminations to indicate a status of a system object or function associated with a corresponding icon. In some implementations, the status indicators can be color coded based on an identified status. For example, the status indicator 330 may be illuminate in a yellow color to indicate that the folder 304 is receiving a file download, and the status indicator 332 may be illuminate in a green color to indicate that a program associated with the icon 308 is running.

In some implementations, the visualization receptacle 300 may only define a depth aspect, e.g., the visualization receptacle 300 may not include a front surface 319. Additional features of visualization receptacles and icons disposed therein are described in more detail below.

Figure 4:
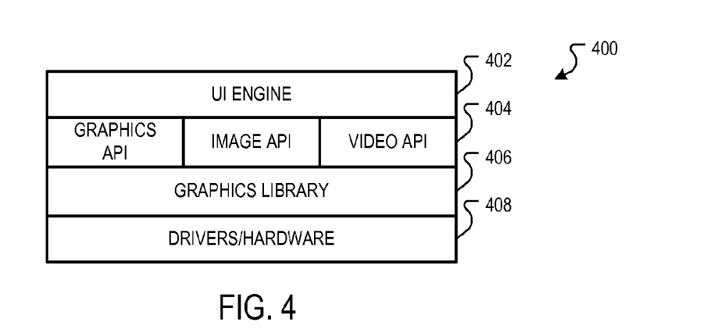
FIG. 4 is a block diagram of an example system layer structure that can be utilized to implement the systems and methods described herein.

FIG. 4 is block diagram of example system layers 400 that can be utilized to implement the systems and methods described herein. Other system layer implementations, however, can also be used.

In an implementation, a user interface engine, such as the UI engine 202, or another UI engine capable of generating a three-dimensional user interface environment, operates at an application level 402 and implements graphical functions and features available through an application program interface (API) layer 404. Example graphical functions and features include graphical processing, supported by a graphics API, image processing, support by an imaging API, and video processing, supported by a video API.

The API layer 404, in turn, interfaces with a graphics library layer 406. The graphics library layer 404 can, for example, be implemented as a software interface to graphics hardware, such as an implementation of the OpenGL specification. A driver/hardware layer 408 includes drivers and associated graphics hardware, such as a graphics card and associated drivers.

Figure 5A:
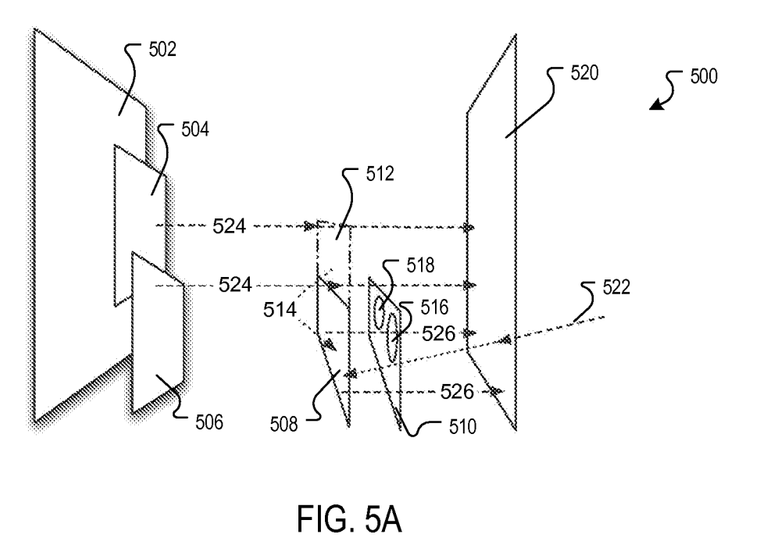
FIG. 5A is a block diagram of an example multidimensional desktop environment.

FIG. 5A is a block diagram of an example multidimensional desktop environment 500. In an implementation, the multidimensional desktop environment 500 can include a back surface 502, application interfaces 504 and 506, a reflection surface 508, and a visualization object receptacle 510. Layers of graphical content from the surfaces can be composited and displayed on a display surface 520.

In an implementation, a reflection content surface 512 can be defined between the back surface 502 and the display surface 520. Visual content (e.g., wallpaper, visualization objects, an application user interface) displayed on the back surface 502 and/or the application interfaces 504, 506 passes through the reflection content surface 512. In an implementation, the visual content that passes through the reflection content surface 512 can be processed by a transform matrix 514 to generate reflected visual content that can be displayed on the reflection surface 508 as viewed at a viewing angle 522. In an implementation, the transform matrix 514 can use an affine transform, which consists of a linear transformation followed by a translation to preserve co-linearity between points and ratios of distances between any two points in the reflection surface 508 and the reflection content surface 512.

A visualization object receptacle 510 can include one or more visualization objects 516 and 518. In an implementation, the visualization objects 516 and 518 can be transformed and displayed on the reflection surface 508 as reflected visualization objects (see, FIGS. 6A and 6B). The visualization objects 516 and 518 can be, for example, icons or other visualizations of system objects.

As the visual content or placement of the back surface 502 and/or application interfaces 504 and 506 changes, a compositor 524 can be executed to refresh the contents of the display surface 520. In an implementation, the compositor can be implemented in the UI engine 202. When changes occur to the visual content passing through the reflection content surface 512, the compositor 524 can be executed to collect the changes and the transform 514 can be applied to update the reflected visual content associated with the reflection surface 508. The updated content associated with the reflection content surface 512 can be passed to a compositor 526 to update the reflection displayed behind the visualization objects 516 and 518 as visible at the viewing angle 522.

In an implementation, the displayed content on the display surface 520 can be a composite of all the visual content logically beneath that the display surface 520. The visual content can be blended together under control of transparency information associated with each point of visual content beneath the display surface 520. As such, visual effects can be provided, such as translucent windows and drop shadows from one window cast upon another window in the multidimensional desktop environment 500.

Figure 5B:
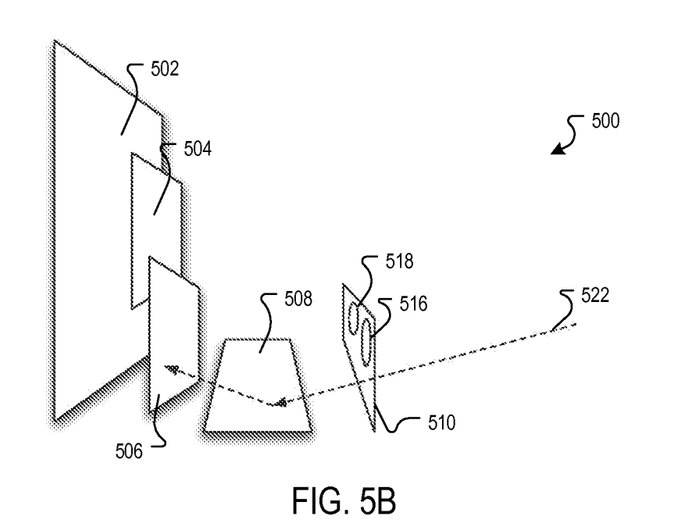
FIG. 5B is a block diagram of an exemplary physical arrangement which the reflection content surface mimics.

FIG. 5B illustrates a block diagram of an exemplary physical arrangement which the reflection surface 508 mimics. In an implementation, the reflection surface 508 can appear to a viewer observing along viewing angle 522 as a mirror at right angle to the visualization objects 516 and 518, and containing a reflection of the visual content of the back surface 502 and the application interfaces 504 and 506. The reflection surface 508 is not limited to being placed at the bottom of a multidimensional desktop environment 500 (i.e., to reflect upward), and can be placed anywhere in the multidimensional desktop environment 500 to reflect content in any orientation. In an implementation, scaling of the reflected content can be applied so as to simulate a curved reflecting surface.

Figure 6A:
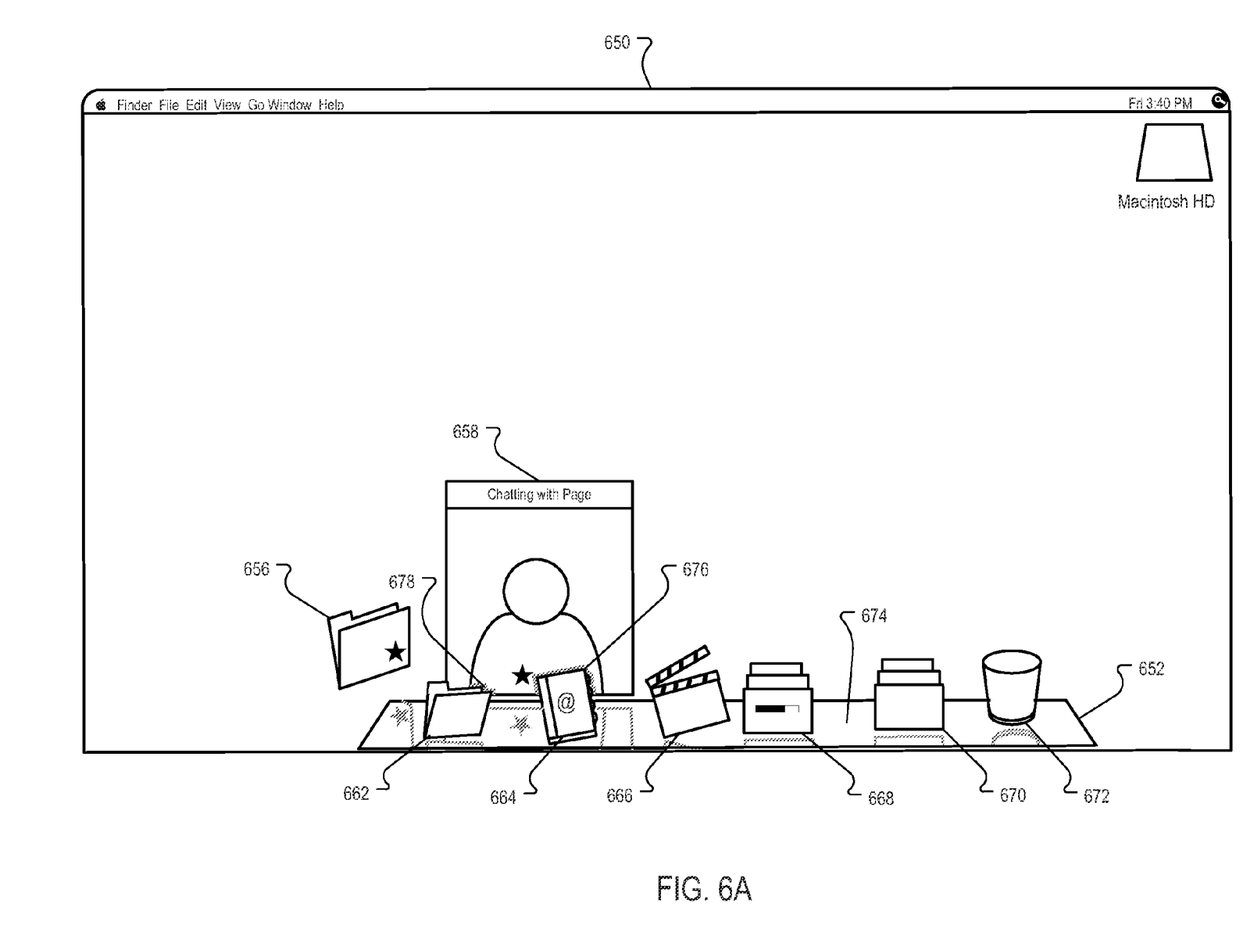
FIG. 6A is a block diagram of another exemplary multidimensional desktop environment.

FIG. 6A is a block diagram of an exemplary multidimensional desktop environment. The multidimensional desktop environment is defined by a back surface 650 and includes a reflection surface 674 logically disposed behind a visualization object receptacle 652. The visualization object receptacle 652 can include visualization objects 662, 664, 666, 668, 670 and 672 (e.g., icons) that are disposed on top of the visualization object receptacle 652. In some implementations, a status indicator can illuminate to indicate a status. For example, the stack item 668 may correspond to recent downloads, e.g., system updates, documents, etc., and the illumination may be lit to indicate that a download is currently in progress. The status indicator can, for example, illuminate according to a color code to indicate different status states.

In an implementation, reflections of the visualization objects 662, 664, 666, 668, 670 and 672 can be displayed on the reflection surface 674. In some implementations, reflections of other system objects, e.g., the folder icon 656 and the application interface 658 can be generated and displayed on the reflection surface 674. In some implementations, the reflections of the visualization objects 662, 664, 666, 668, 670 and 672, the folder icon 656 or the application interface 658 can be scaled when displayed on the reflection surface 674

In some implementations, the transparency of the visualization objects 662, 664, 666, 668, 670 and 672, the folder icon 656 or the application interface 658 can vary. In an implementation, shadowing 676 and 678 can be provided behind visualization objects to produce an effect as if the visualization objects were casting a shadow along the viewing angle toward the back surface 650.

Figure 6B:
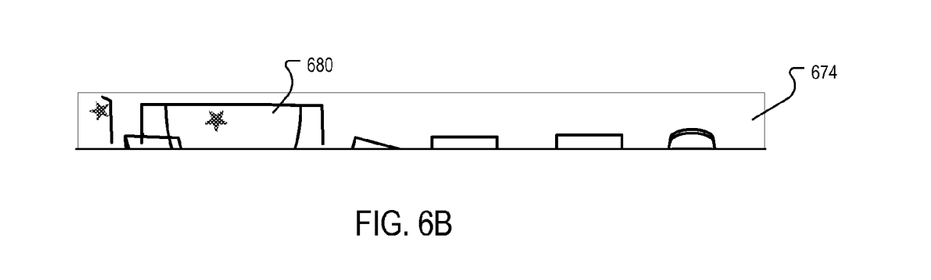
FIG. 6B is a block diagram of a reflection surface.

FIG. 6B is a block diagram of the reflection surface 674. In an implementation, the reflection surface 674 can include parts of the application interface 658 (or other object in the multidimensional desktop environment) that would be partially obscured by the visualization objects on the visualization object receptacle 652. For example, visual content 680 within the application interface 658 would be rendered on the reflection surface 674, however the visual content 680 will obscured by visualization objects 662 and 664 when displayed to the user as shown in FIG. 6A.

Figure 7:
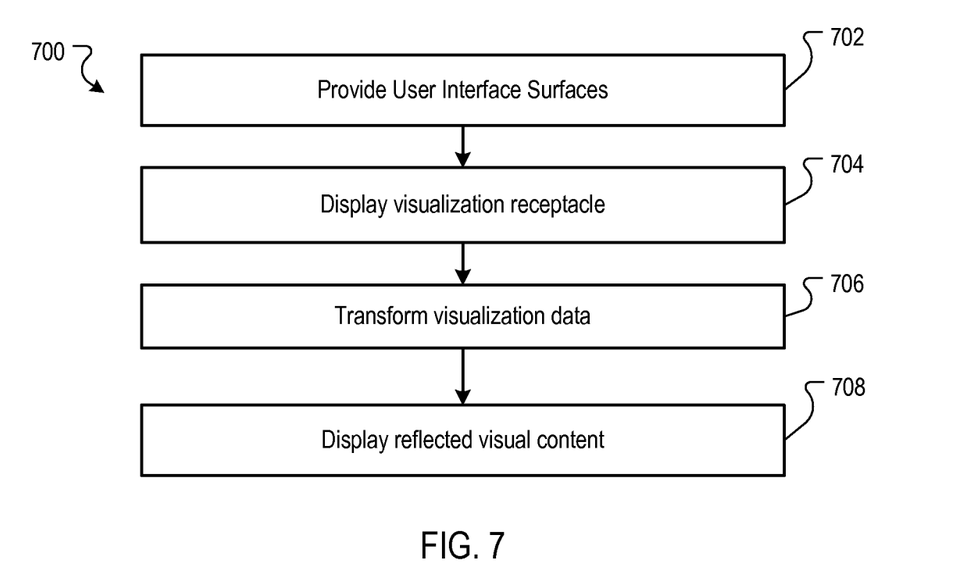
FIG. 7 is a flow diagram of an example process for generating a multidimensional desktop environment having reflected visual content.

FIG. 7 is a flow diagram of an example process 700 for generating multidimensional desktop environment having reflected visual content. The process 700 can, for example, be implemented in a processing device, such as the system 100 of FIG. 1, implementing user interface software and/or hardware, such as the example implementations described with respect to FIGS. 2, 3 and 4.

Stage 702 provides user interface surfaces. For example, the system 100, implementing any one of the UI engines described in FIGS. 2, 3 and 4, can provide the back surface 502, the reflection surface 508, the reflection content surface 512 and the display surface 520 as shown in FIG. 5A. Optionally, one or more application interfaces 504 or 506 can be provided in response to a user instantiation of an application instance as shown in FIG. 5A.

Stage 704 displays a visualization receptacle. For example, the system 100, implementing any one of the UI engines described in FIGS. 2, 3 and 4, can display the visualization receptacle 510 having a visualization object 516 or 518 as shown in FIG. 5A or 5B.

Stage 706 transforms visualization data. For example, the system 100, implementing any one of the UI engines described in FIGS. 2, 3 and 4, can transform visualization data associated with one of the visualization objects 516 or 518 to create a reflected visualization object as shown in FIG. 6A.

Stage 708 displays the reflected visual content. For example, the system 100, implementing any one of the UI engines described in FIGS. 2, 3 and 4, can display the reflected visualization objects as shown in FIG. 6B.

Figure 8:
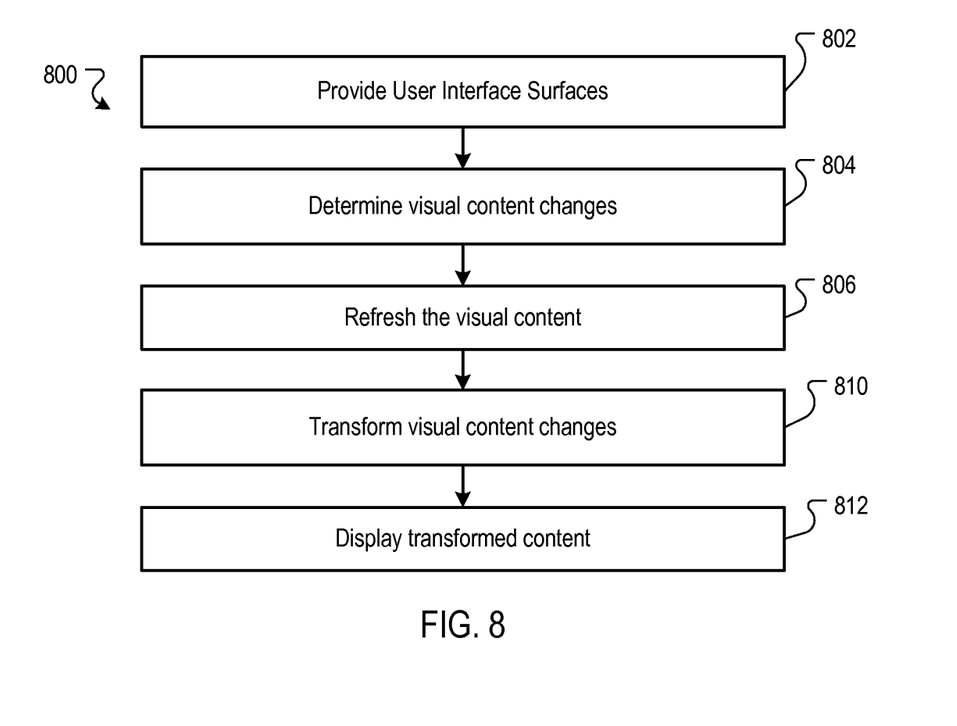
FIG. 8 is a flow diagram of another example process for generating a multidimensional desktop environment having reflected visual content.

FIG. 8 is a flow diagram of another example process 800 for generating multidimensional desktop environment having a simulated reflection. The process 800 can, for example, be implemented in a processing device, such as the system 100 of FIG. 1, implementing user interface software and/or hardware, such as the example implementations described with respect to FIGS. 2, 3 and 4.

Stage 802 provides user interface surfaces. For example, the system 100, implementing any one of the UI engines described in FIGS. 2, 3 and 4, can provide the back surface 502, the reflection surface 508, the reflection content surface 512 and the display surface 520 as shown in FIG. 5A. Optionally, one or more application interfaces 504 or 506 can be provided in response to a user instantiation of an application instance as shown in FIG. 5A.

Stage 804 determines visual content changes. For example, the system 100, implementing any one of the UI engines described in FIGS. 2, 3 and 4, can determine if visual content within the back surface 502 and/or application interface 504 or 506 has changed.

Stage 806 refreshes the visual content. For example, the system 100, implementing any one of the UI engines described in FIGS. 2, 3 and 4, can run the compositor 524 to update the display surface 520 to reflect the visual content changes in the back surface 502 or application interface 504 or 506.

Stage 810 transforms the changes. For example, the system 100, implementing any one of the UI engines described in FIGS. 2, 3 and 4, transforms the changes to the visual content within the reflection content surface 512 to create reflective content to be applied to the reflection surface 508.

Stage 812 displays the transformed content. For example, the system 100, implementing any one of the UI engines described in FIGS. 2, 3 and 4, can run a compositor to update the reflection surface 508 to create a reflection as shown in FIGS. 5A, 6A and 6B.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method, comprising:
   providing for display a display object in a three-dimensional user interface;
   providing for display an object receptacle and a visualization object located on the object receptacle, the object receptacle being displayed in front of the display object such that the visualization object obscures at least a portion of the display object;
   producing a reflection of the obscured portion of the display object on a reflection surface in the three-dimensional user interface; and
   providing the reflection for display on a display device such that the portion of the display object obscured by the visualization object is visible in the reflection.

2. The method of claim 1, wherein the three-dimensional user interface comprises a back surface and a side surface, the method comprising:
   providing the object receptacle and the reflection surface for display on the side surface, and
   providing the display object for display on the back surface.

3. The method of claim 2, comprising:
   providing for display a shadow of the visualization object along a viewing angle of the three-dimensional user interface towards the back surface.

4. The method of claim 3, comprising:
   obscuring at least a portion of the reflection by the visualization object.

5. The method of claim 1, wherein;
   the display object includes an application interface, and
   the visualization object includes an interactive icon.

6. The method of claim 1, comprising:
   providing a reflection of the visualization object for display on the reflection surface;
   determining changes to the visualization object;
   and transforming the changes to update the reflection surface.

7. The method of claim 1, comprising:
   scaling the reflection to indicate a curvature of the reflection surface.

8. The method of claim 1, comprising:
   applying an affine transformation to determine the reflection of the obscured portion of the display object.

9. The method of claim 1, comprising
   determining transparency information associated with surfaces between a back surface and a viewing surface; and
   producing a shadow that is cast from visual content in a surface closer to the viewing surface onto a surface further from the viewing surface.

10. The method of claim 1, comprising:
    scaling the reflection of the obscured portion of the display object relative to the display object.

11. The method of claim 1, wherein the reflection surface is located beneath the object receptacle.

12. A system, comprising:
    one or more computers configured to perform operations comprising:
    providing for display a display object in a three-dimensional user interface;
    providing for display an object receptacle and a visualization object located on the object receptacle, the object receptacle being displayed in front of the display object such that the visualization object obscures at least a portion of the display object;
    producing a reflection of the obscured portion of the display object on a reflection surface in the three-dimensional user interface; and
    providing the reflection for display on a display device such that the portion of the display object obscured by the visualization object is visible in the reflection.

13. The system of claim 12, wherein the three-dimensional user interface comprises a back surface and a side surface, the operations comprising:
    providing the object receptacle and the reflection surface for display on the side surface, and
    providing the display object for display on the back surface.

14. The system of claim 13, wherein:
    the display object includes an application interface, and
    the visualization object is an interactive three-dimensional icon.

15. The system of claim 14, wherein:
    the reflection is partially obscured by the visualization object.

16. The system of claim 12, wherein:
    the reflection of the obscured portion of the display object is scaled relative to the display object.

17. The system of claim 12, wherein:
    a shadow is cast from the visualization object toward a back surface.

18. The system of claim 12, wherein:
an amount transparency is applied to the object receptacle such that the reflection is partially visible through the object receptacle.

19. The system of claim 12, wherein:
the object receptacle comprises a dock, and the visualization object comprises an icon.

20. A non-transitory computer readable medium storing instructions that are executable by a processing device, and upon such execution cause the processing device to perform operations comprising:
providing for display a display object in a three-dimensional user interface;
providing for display an object receptacle and a visualization object located on the object receptacle, the object receptacle being displayed in front of the display object such that the visualization object obscures at least a portion of the display object;
producing a reflection of the obscured portion of the display object on a reflection surface in the three-dimensional user interface; and
providing the reflection for display on a display device such that the portion of the display object obscured by the visualization object is visible in the reflection.

21. The computer readable medium of claim 20, the operations comprising applying a transform to the obscured portion of the display object to determine the reflection of the obscured portion of the display object.

22. The computer readable medium of claim 21, wherein the display object comprises an application interface, the application interface including a window containing visual content, the visual content being obscured by the visualization object.

23. The computer readable medium of claim 22, the operations comprising:
applying a transform to the visual content; and
providing for display a reflection of the visual content on the reflection surface.

24. The computer readable medium of claim 20, the operations comprising scaling a size of the reflection of the obscured portion of the display object relative to the obscured portion of the display object.

25. The computer readable medium of claim 20, the operations comprising creating a shadow that is cast behind the visualization object toward a back surface.

* * * * *

UNITED STATES PATENT AND TRADEMARK OFFICE
CERTIFICATE OF CORRECTION

| | | Page 1 of 1 |
|---|---|---|
| PATENT NO. | : 8,432,396 B2 | |
| APPLICATION NO. | : 11/760703 | |
| DATED | : April 30, 2013 | |
| INVENTOR(S) | : Paquette et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1137 days.

Signed and Sealed this
Sixteenth Day of December, 2014

Michelle K. Lee
*Deputy Director of the United States Patent and Trademark Office*